(12) United States Patent  
Rains

(10) Patent No.: US 7,467,923 B2
(45) Date of Patent: Dec. 23, 2008

(54) FLUID FLOW ENERGY CONVERSION APPARATUS

(76) Inventor: Cecil Albert Rains, 1126 Glenda, Pearland, TX (US) 77581

( * ) Notice: Subject to any disclaimer, the term of this patent is extended or adjusted under 35 U.S.C. 154(b) by 493 days.

(21) Appl. No.: 11/199,537

(22) Filed: Aug. 8, 2005

(65) Prior Publication Data

US 2007/0031254 A1 Feb. 8, 2007

(51) Int. Cl.
*F03B 3/14* (2006.01)
(52) U.S. Cl. ............... 416/117; 416/140; 416/142; 415/4.2
(58) Field of Classification Search ............ 416/132 R, 416/132 B, 117, 142, 143, 140; 415/911, 415/4.2, 4.4, 905, 907; 417/330
See application file for complete search history.

(56) References Cited

U.S. PATENT DOCUMENTS 1,239 A * 7/1839 Evans .................. 415/149.1

FOREIGN PATENT DOCUMENTS

GB         2000233 A  *  1/1979

* cited by examiner

*Primary Examiner*—Richard Edgar
(74) *Attorney, Agent, or Firm*—Charles D. Gunter, Jr.

(57) ABSTRACT

Tidal forces used for generation of electrical power has long been a solution to a recognized need. A really practical device to convert the energy of the fluid flow through tidal inlets into electrical power is the subject of this invention.

9 Claims, 6 Drawing Sheets

FLUID FLOW ENERGY CONVERSION APPARATUS

BACKGROUND OF THE INVENTION

Previous inventors have limited the use of their invention to underwater loads as shown in the Atherton U.S. Pat. No. 4,134,710 and in the Elder U.S. Pat. No. 6,448,669. Prior inventors have used horizontal swinging panels which did not effectively completely disappear or become a line or an edgewise plane through the returning upstream portion of the cycle. These panels always presented substantial drag during the returning upstream portion of the cycle. The impeller vane surfaces disclosed in Hung U.S. Pat. No. 5,844,323 are limited in their opening by stopping means apparently at the midpoint of the vane surfaces on a rod fixed to the central shaft. The support means for the disclosed invention is two fixed surfaces. At the extreme ends of the vane surfaces. The opening stopping limiting means is placed on the fixed upper and lower stabilizing surfaces and not in the middle of the vane where it could bend or deflect or damage the vane. The closure stopping means is not disclosed in the prior art. Prior tidal energy power generation proposals had not solved the problem of providing a unidirectional rotation of the drive shaft and focused on reversing direction mechanisms such as that of the Campbell U.S. Pat. No. 6,759,757.

SUMMARY OF THE INVENTION

A Fluid Flow Energy Conversion Apparatus comprised of an impeller device having a vertical upright shaft mounted in a fixed frame with vanes driven by currents which can be installed in inlets or tidal areas where diurnal surges provide currents from opposite directions. The impeller device always turns in a uniform direction without regard to the direction in which the current is flowing through the frame in which the impeller is mounted. A plurality of impeller devices in supporting frames can be suspended from a structure across the two principal directions of flow of the tidal current. A plurality of impeller devices in supporting frames can also be stabilized and put in place upon structure in the marine bottom across the two principal directions of flow of the tidal current. Facilitated by the unidirectional turning characteristic of the impeller device generators or other loads may be driven in a uniform direction by the tidal current. Brakes and other controls will be required for maintenance and installation of the loads.

DESCRIPTION OF A PREFERRED EMBODIMENT

Figure 1:
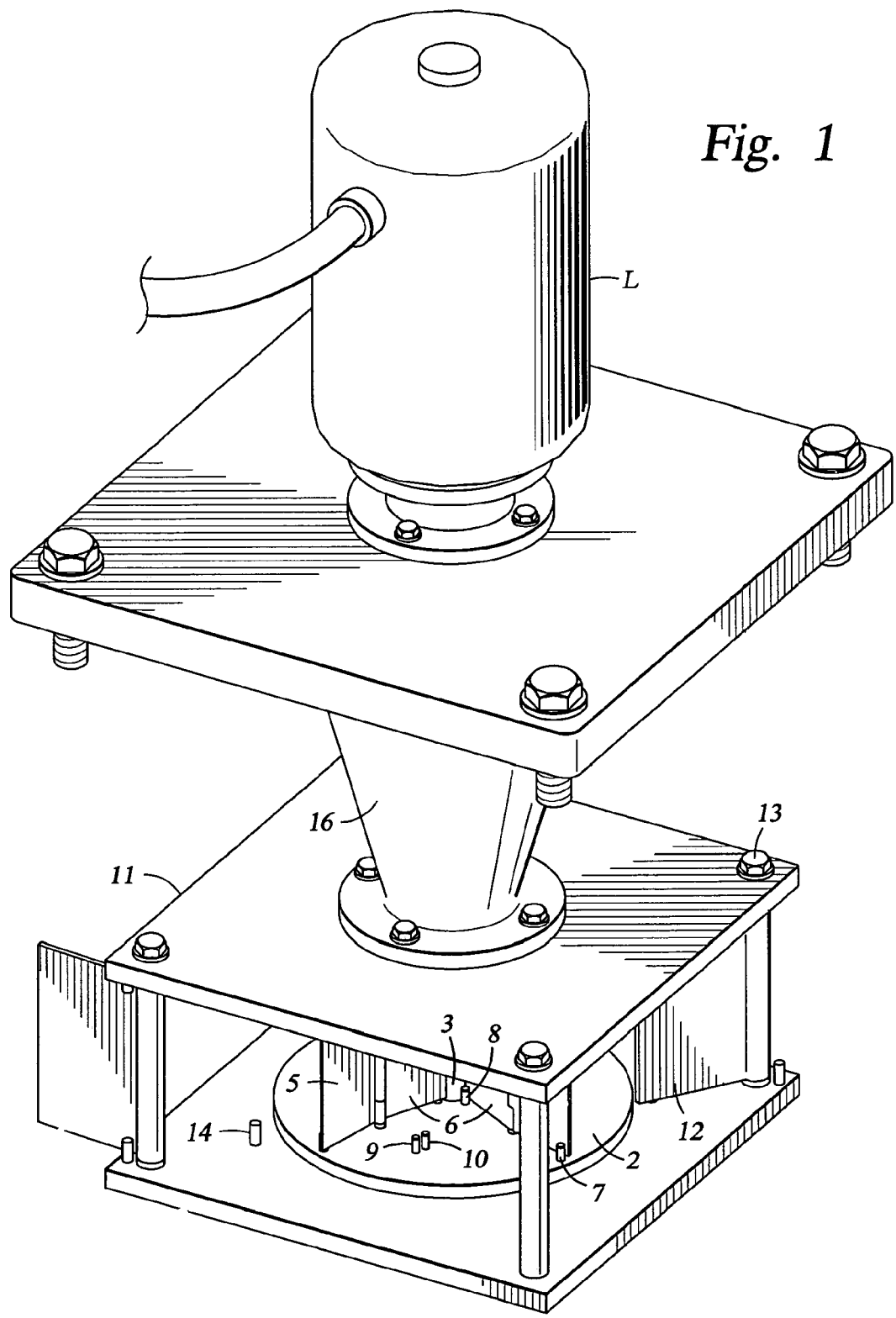
FIG. 1 Perspective view of the preferred embodiment of present invention connected to a load.
Figure 2:
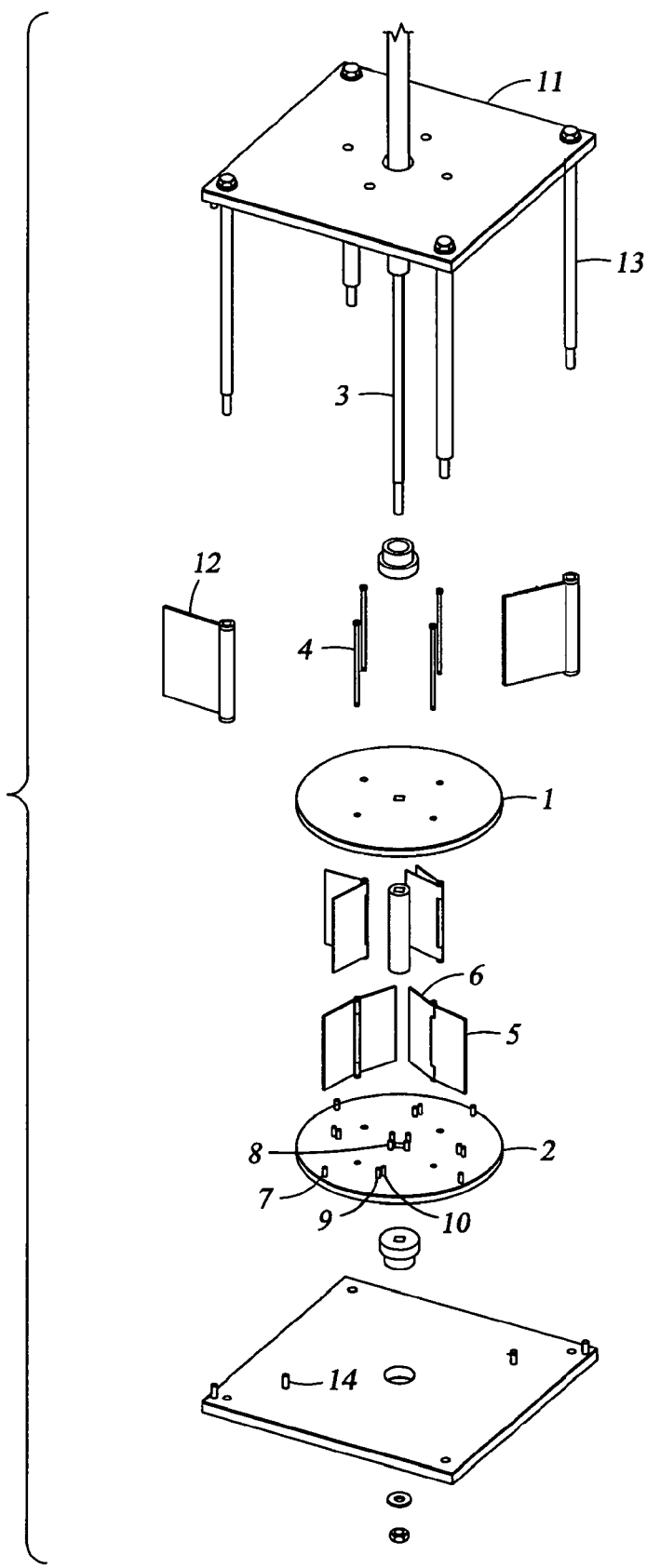
FIG. 2 Exploded view of the impeller of the preferred embodiment.
Figure 3:
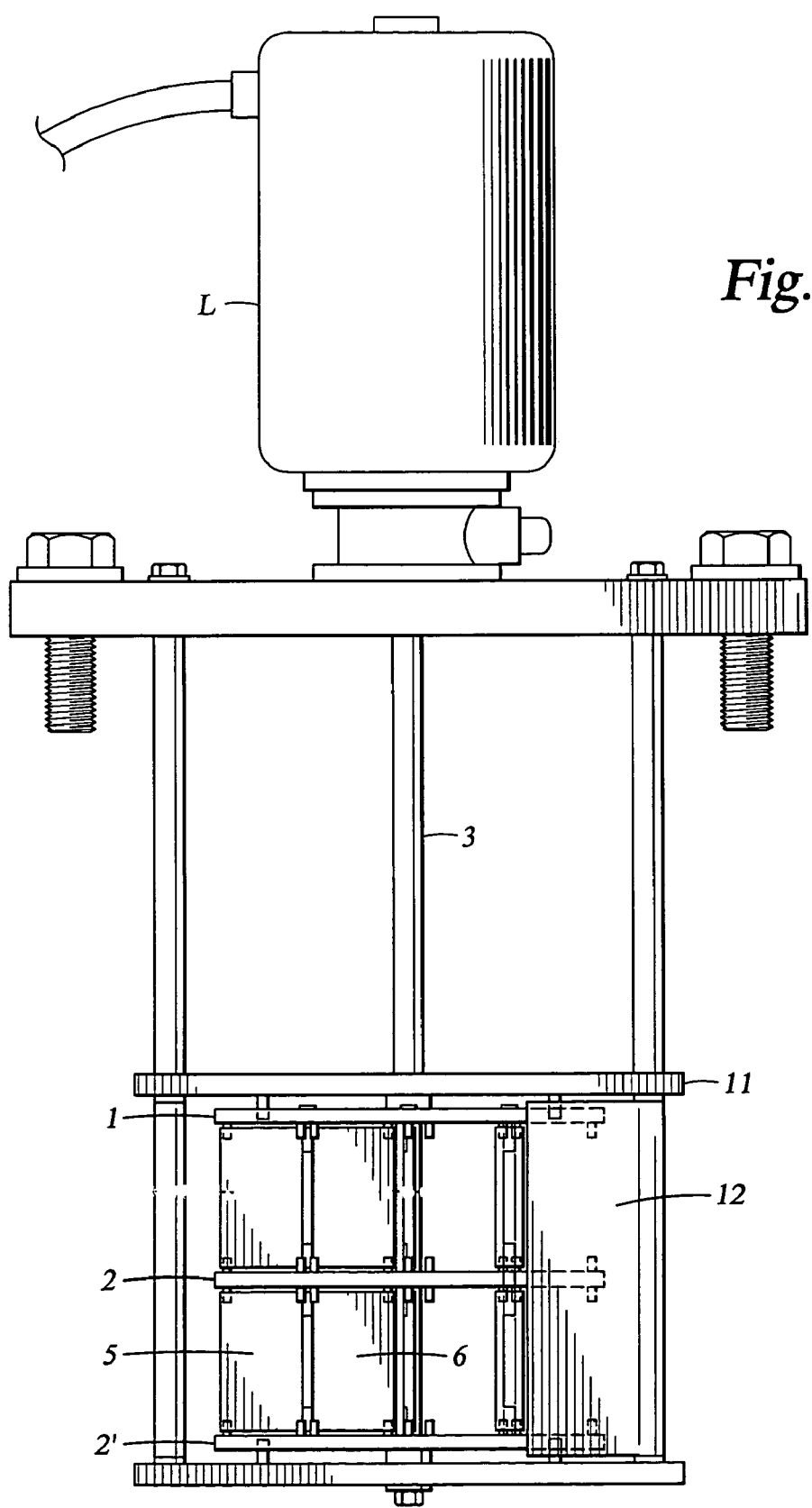
FIG. 3 Front view of an alternate embodiment of the present invention.
Figure 4:
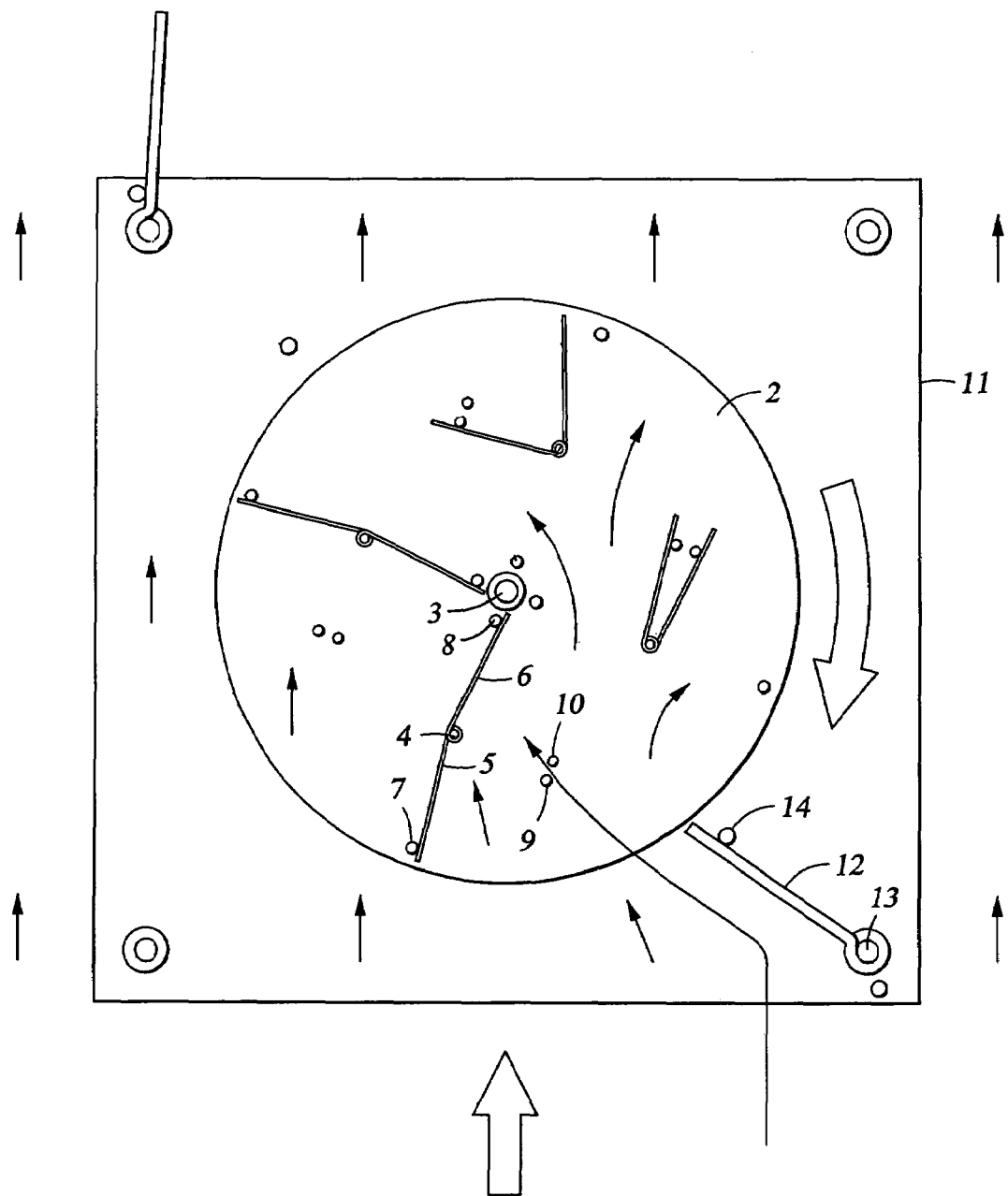
FIG. 4 Top cross-section view of the impeller.
Figure 5:
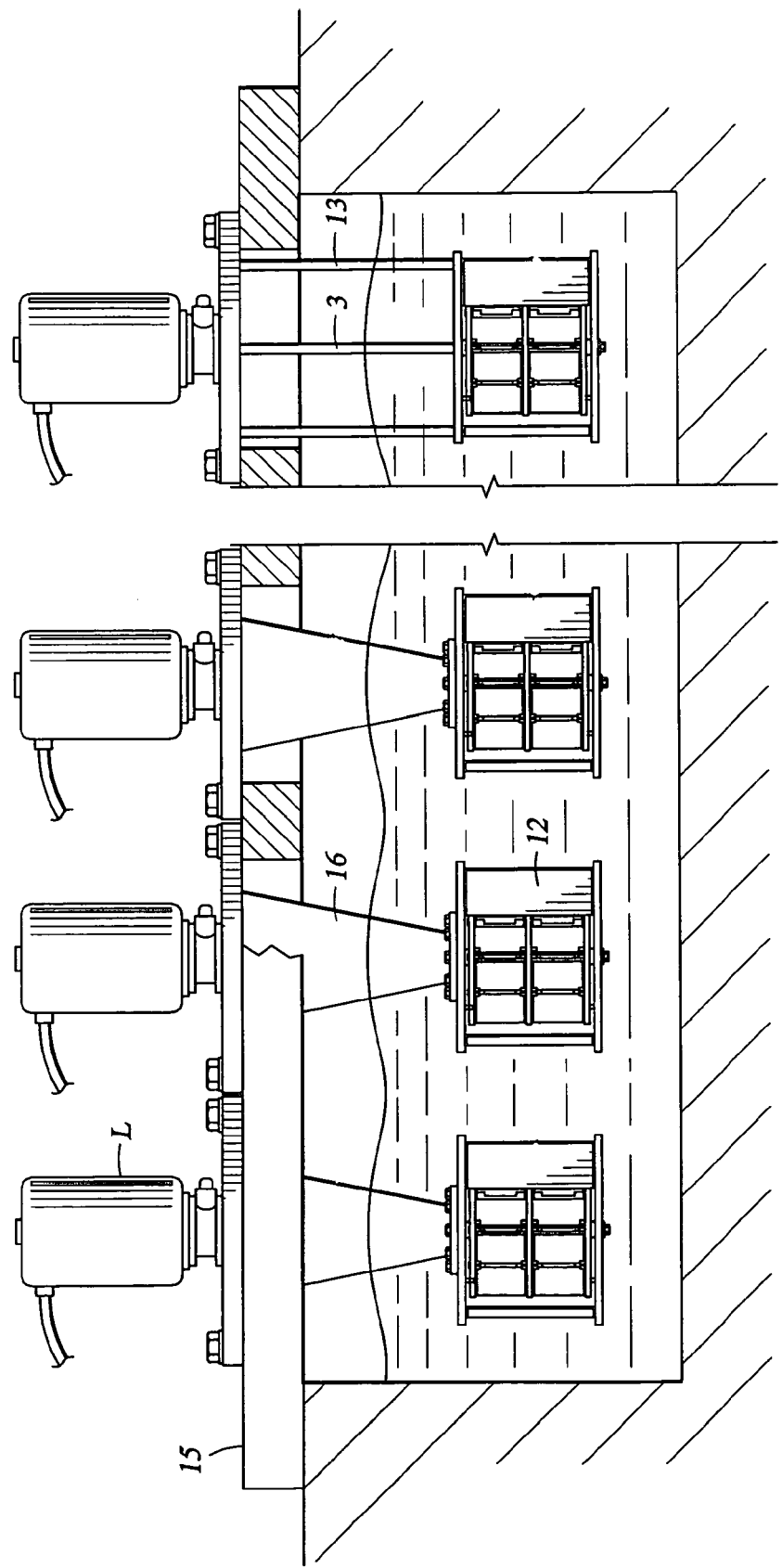
FIG. 5 Front view of a plurality of embodiments of the present invention mounted in array on a common structure.

The impeller device connected to a load is shown in FIG. 1. The Impeller device is comprised as shown in the exploded view of FIG. 2 of an upper horizontal stabilizing surface (1) sometimes described as a first plate and a lower horizontal stabilizing surface (2) sometimes referred to as a second plate connected at regular intervals about a central vertical shaft (3) which is affixed to both the upper horizontal stabilizing surface, the first plate and the lower horizontal stabilizing surface, the second plate. The connecting device between the upper horizontal stabilizing surface, the first plate and the lower horizontal stabilizing surface, the second plate is a hinge pin (4) for two planar surfaces, sometimes referred to as panels, an exterior vertical planar surface (5) sometimes described as an exterior vertical panel and a central or inner vertical planar surface (6) sometimes referred to as an inner vertical panel which together act to form a bifold vane. The most open position of the exterior vertical planar surface of the bifold vane is limited by an opening stopping device (7) the first stop which may be located on and connected to the lower horizontal stabilizing surface or second plate or on the upper horizontal stabilizing surface or first plate or on both such horizontal stabilizing surfaces to provide maximum strength and resistance. The most open position of the central or interior vertical panel of the bifold vane is limited by an opening stopping device (8) the second stop which may be located on and connected to the lower horizontal stabilizing surface or second plate or on the upper horizontal stabilizing surface or first plate or on both such horizontal stabilizing surfaces to provide maximum strength and resistance. The first stop and the second stop limit the opening of the bifold vane to 180 degrees when the force of the current flowing through the mounted impeller permits or forces such opening. The overhead view of these elements of the invention is set out in FIG. 4. Although varying ratios of the dimensions of the vertical panels forming the bifold vanes may be used an optimum ratio of the height of the panel being one and one half times the width of the panel has been observed. The vertical shaft is mounted in a frame which maintains the shaft in a vertical position with respect to the bottom of the channel through which the fluid is flowing. The frame in which the impeller device is mounted can be extended with sufficient rigidity to attach the frame mounted impeller device to a structure over the fluid in which the impeller is immersed, an overfluid structure (16). FIG. 5 shows a series of impellers in frames mounted to an overfluid structure. The frame need not have four corners as shown in the figures but may be of any shape. A shaft cover may be included but is not necessary for the operation of the invention. However the shaft cover may be used to provide additional or supplemental vertical dimensional stability and torque resistance to the assembly of the frame, overfluid structure and load. FIG. 3 illustrates a side view of one version of the impeller device connected to a load.

The most closed position of the exterior vertical panel of the bifold vane is limited by a closing stopping device (9) the third stop which may be located on and connected to the lower horizontal stabilizing surface or second plate or on the upper horizontal stabilizing surface or first plate or on both such horizontal stabilizing surfaces to provide maximum strength and resistance. The most closed position of the central or interior vertical panel of the bifold vane is limited by a closing stopping device (10) the fourth stop which may be located on and connected to the lower horizontal stabilizing surface or second plate or on the upper horizontal stabilizing surface or first plate or on both such horizontal stabilizing surfaces to provide maximum strength and resistance.

As the impeller device rotates about its central axis which is the center of the fixed vertical shaft each hinge pin rotates about the central axis. During the rotation the force of the current flowing through the fixed frame which includes the top and bottom plates (11) and the connecting members (13) in which the vertical shaft is mounted causes the interior vertical panel of the bifold vane to rotate about the hinge pin and close in proximity to the exterior vertical panel. A closure preventing stopping device (10) is mounted in the upper stabilizing surface or first plate or the lower stabilizing surface or second plate or both which prevents the interior panel from coming into contact with the exterior panel of the bifold vane. A closure preventing stopping device (9) is mounted in the upper stabilizing surface or first plate or the lower stabilizing surface or second plate or both which prevents the exterior panel from coming into contact with the interior panel of the bifold vane. This feature of the invention facilitates the opening of the bifold vane structure in that when the bifold vane rotates about the central axis into the portion of its cycle where opening is desired the fluid in the current will act upon both the interior vertical panel and the exterior vertical panel to open the bifold vane and force the interior vertical panel and the exterior vertical panel against the opening stopping devices to provide maximum torque to impart rotation to the impeller device. The drawings depict the simplest form of ganged or stacked impellers affixed to a single shaft. The stacking of two or more impellers affixed to a single shaft involves the use of an intermediate plate functioning as the lower stabilizing surface or plate for the topmost impeller and as the upper stabilizing surface or plate for the lower impeller device. The use of two or more impellers in a stacked fashion is a function of the depth of the fluid into which the impeller system is immersed.

To improve the operation of the impeller a hinged deflector (12) can be installed outside the turning diameter of the impeller device. The hinged deflector trails in the direction of the current when not in use on the downcurrent side of the impeller device and is limited in its rotation on the hinge pin (13) attached to or a part of the frame when it is on the upcurrent side of the impeller device by a stopping means (14) the fifth stop attached to the frame so that it has the effect of directing the predominating current in the direction of rotation of the impeller device reducing drag on the collapsed bifold vane as it rotates about the central axis from the downcurrent portion of its cycle to the upcurrent portion of its cycle and causing the fluid stream to impinge on the trailing edge of the exterior vertical panel of the bifold vane at an angle which would tend to force the exterior vertical panel of the bifold vane to rotate about the hinge pin earlier in its cycle than would have occurred if the direction of the current had not been deflected in the direction of rotation of the impeller device. The rotation of the deflector away from the impeller may be limited by a limiting stop (15) so that the deflector will always return to its proper useful position when the deflector is on the upcurrent side of the impeller device as mounted in the frame.

Figure 6:
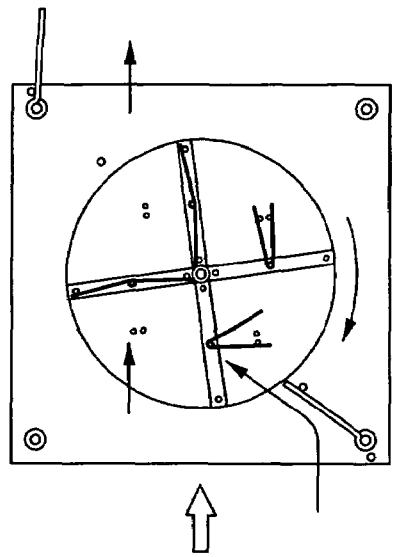
FIG. 6 Top cross-section view of the impeller of the present invention in operation.
Figure 7:
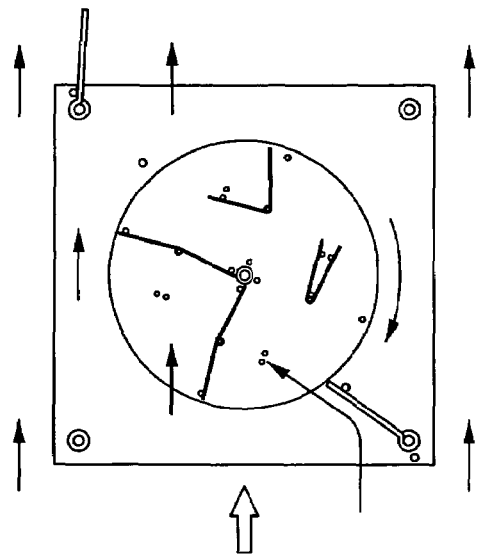
FIG. 7 View similar to FIG. 6, in which the impeller has rotated further clockwise.
Figure 8:
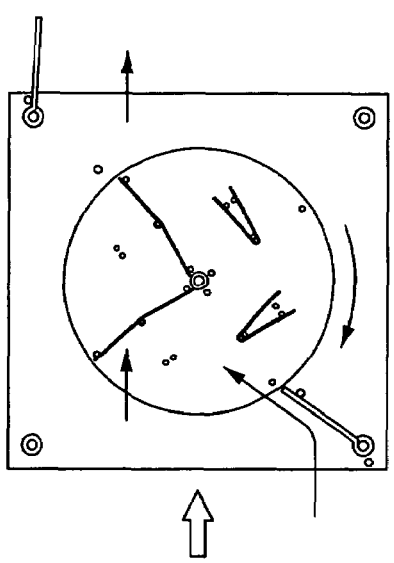
FIG. 8 View similar to FIG. 7, in which the impeller has rotated yet further clockwise.
Figure 9:
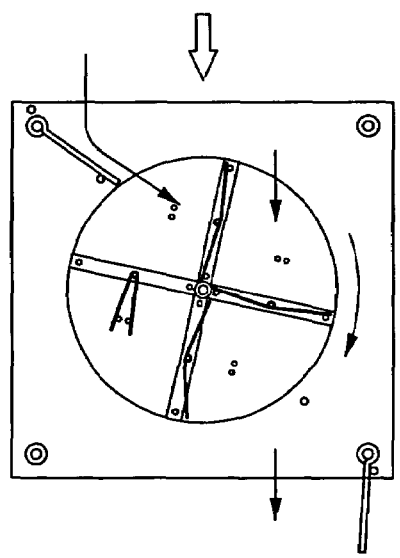
FIG. 9 View similar to FIG. 8, except the direction of the liquid flow has reversed.

FIG. 6 shows the impeller as the collapsed vane rotates into the liquid stream as redirected by the deflector plate. FIG. 7 shows the impeller as most upcurrent vane rotates and opens under the influence of the liquid stream as redirected by the deflector plate and the most downcurrent vane begins to collapse as the current impacts the side of the vane on the same side as the opening limiting stops. FIG. 8 shows the impeller as most upcurrent vane rotates and is forced fully open under the influence of the current and the two vanes in the return cycle against the current are in their most closed position limited by the closure preventing stops. FIG. 9 shows the impeller as the current flows from the direction opposite that shown in FIGS. 6, 7 and 8 and the deflector plates assume the positions deflecting the current on the upcurrent side of the impeller and trailing in the current on the downcurrent side of the impeller.

The above described system is very highly efficient. The device always turns in a uniform direction regardless of the angle of attack of fluid across the frame in which the impeller device is mounted. The uniform direction of turning can be either clockwise or counterclockwise depending on the placement of the stops limiting the travel of the vertical panels. Brakes and other controls will be required for maintenance and installation of the loads.

The invention is in no way limited to the above disclosed embodiment, and within the scope of the patent application, many changes and variations may be brought to the described embodiment notably as regards the shape, the arrangement, the composition and the number of components which are used for embodying the invention. The connection between the shaft and the load element made fast to the shaft may be made by any number of means including gears, chain wheel systems, belt pulley systems and similar utilitarian means for transferring energy from the impeller shaft to the load. The load element may be located atop the frame or on a structure to which the frame is attached. If a portion of the structure to which the frame supporting the impeller device is attached is substantially above the level of the fluid it is described as an overfluid structure. The load element may be an electricity generator or any other mechanical load device which may be turned by a connection means between the central vertical shaft of the impeller and the load element. The impeller device may be used to power water pumps or any other load in isolated areas or where water is a convenient source of power. The load element may be located below the surface of the fluid at the bottom end of the shaft where the connection may be made as described above. If the fluid stream is sufficiently deep two or more impellers may be fixed to the same central vertical shaft. It is contemplated that the vertical panels of the impeller device will remain substantially submerged in the fluid stream. The frame in which the impeller is mounted can be suspended from a structure supported by the bottom of the channel through which the fluid stream flows or from the shore of the channel through which the fluid stream flows or both. It is not necessary that the supporting structure be located near or adjacent to the shore of the channel through which the fluid stream flows. An array of frames each supporting one or more impeller devices may be supported from a single structure situated in the channel through which the fluid stream flows. Although the array of impeller devices supported in such a structure would perform well regardless of the relative angle of the supporting structure supporting a line of the frames to the direction of the current the optimal arrangement would have the structure supporting a number of impeller devices in frames placed at right angles to the primary directions of flow of the fluid in the channel. In a tidal inlet the supporting structure would be envisioned to be placed in the tidal channel perpendicularly across the two principal directions of the tidal surges.

I claim:
1. An impeller device operationally connected to drive a load, the device comprising:
 a vertical shaft;
 an upper horizontal surface and a lower horizontal surface fixed to the shaft;

a plurality of panels, each panel being mounted upon a hinge pin connected between the upper horizontal surface and the lower horizontal surface, each panel being comprised of a vertical exterior planar surface and a vertical interior planar surface which are mounted on the respective hinge pins for rotational movement relative to the upper and lower horizontal surfaces;

wherein each panel has a first stop associated therewith in a selected one of the upper and lower horizontal surfaces to limit the travel of its vertical exterior planar surface about its respective hinge pin to a most open position;

wherein each panel has a second stop associated therewith in a selected one of the upper and lower horizontal surfaces to limit the travel of its vertical interior planar surface about its respective hinge pin to a most open position;

wherein each panel has a third stop associated therewith in a selected one of the upper and lower horizontal surfaces to limit the travel of its respective vertical exterior planar surface about its respective hinge pin to a most closed position;

wherein each panel has a fourth stop associated therewith in a respective one of the upper and lower horizontal surfaces to limit the travel of its respective vertical interior planar surface about its respective hinge pin to a most closed position;

and a connection between the vertical shaft and the load to be driven.

2. The impeller device of claim 1, further comprising at least one vertical deflector mounted on a hinge pin between the upper and lower horizontal surfaces; and an additional stop located on a selected one of the upper and lower horizontal surfaces to limit travel of the vertical deflector.

3. The impeller device of claim 2, further comprising: a frame in which the vertical shaft is mounted to stabilize the orientation of the vertical shaft in a fluid stream.

4. The impeller device of claim 1 in which the panels spread before a downstream direction of fluid to form a vertical plane parallel to the vertical shaft of the impeller during rotation of the impeller on a downstream side of rotation and collapse together during a rotational return through an upstream side of rotation of the impeller.

5. The impeller device of claim 4 in which the panels spread to positions limited by their respective stops before the downstream direction of the fluid to form a vertical plane parallel to the vertical shaft of the impeller during the rotation of the impeller on the downstream side of the rotation and collapse nearly together but limited by their respective closure preventing stops during the rotational return through the upstream side of the rotation of the impeller.

6. An impeller device as described in claim 4, in which the device is used to generate electricity by affixing a generator to the vertical shaft of the impeller device.

7. The impeller device of claim 1, wherein the device is mounted so that the impeller device is completely submerged in the fluid stream from an overfluid structure.

8. The impeller device of claim 1, wherein the device is mounted so as to be partially submerged in the fluid stream from an overfluid structure.

9. A series of the impeller devices as described in claim 1 affixed to a single vertical shaft mounted in a frame suspended so that the series of impeller devices are at least partially submerged in the fluid stream from an overfluid structure.

* * * * *